(12) United States Patent
Kokubo et al.

(10) Patent No.: US 7,197,869 B2
(45) Date of Patent: Apr. 3, 2007

(54) SECONDARY AIR SUPPLYING STRUCTURE OF INTERNAL COMBUSTION ENGINE

(75) Inventors: Fumihiro Kokubo, Toyota (JP); Masahiro Jinda, Okazaki (JP)

(73) Assignees: Toyota Jidosha Kabushiki Kaisha, Toyota (JP); Futaba Industrial Co., Ltd., Okazaki-shi (JP)

( * ) Notice: Subject to any disclaimer, the term of this patent is extended or adjusted under 35 U.S.C. 154(b) by 0 days.

(21) Appl. No.: 11/174,999

(22) Filed: Jul. 6, 2005

(65) Prior Publication Data

US 2006/0021336 A1   Feb. 2, 2006

(30) Foreign Application Priority Data

Jul. 28, 2004   (JP) ............... 2004-219883

(51) Int. Cl.
  *F01N 3/10*   (2006.01)
(52) U.S. Cl. ............... 60/305; 60/289; 60/304; 60/306
(58) Field of Classification Search ............ 60/289, 60/304, 305, 323, 306
See application file for complete search history.

(56) References Cited

U.S. PATENT DOCUMENTS

| | | | | |
|---|---|---|---|---|
| 3,522,702 A | * | 8/1970 | Grosseau | 60/305 |
| 3,785,152 A | * | 1/1974 | Pozniak et al. | 60/290 |
| 3,798,903 A | * | 3/1974 | Mitchell et al. | 60/282 |
| 3,934,411 A | * | 1/1976 | Masaki et al. | 60/305 |
| 3,948,229 A | * | 4/1976 | Abthoff et al. | 123/184.31 |
| 4,056,933 A | * | 11/1977 | Nohira et al. | 60/305 |
| 4,224,792 A | * | 9/1980 | Hayashi et al. | 60/305 |
| 4,630,439 A | * | 12/1986 | Hudson, Jr. | 60/305 |
| 5,419,125 A | * | 5/1995 | Fukae et al. | 60/305 |
| 5,768,890 A | * | 6/1998 | Bekkering et al. | 60/305 |

FOREIGN PATENT DOCUMENTS

| | | |
|---|---|---|
| JP | 05-010735 U | 2/1993 |
| JP | 2000-027641 | 1/2000 |
| JP | 2003-035136 | 2/2003 |

* cited by examiner

*Primary Examiner*—Thomas Denion
*Assistant Examiner*—Diem Tran
(74) *Attorney, Agent, or Firm*—Oliff & Berridge, PLC

(57) ABSTRACT

In a secondary air supplying structure of an internal combustion engine, extending portions protruding upward are arranged in the number corresponding to the number of cylinders. Extending portions are each provided with a secondary air distribution path. To a surface of extending portion to which secondary air supplying pipe abuts, a seating face that conforms to the outer shape of secondary air supplying pipe is formed. Secondary air distributing path is arranged to be inclined downwardly from secondary air supplying pipe side toward the cylinder exhaust system of cylinder head. Thus, it is possible to provide the secondary air supplying structure of an internal combustion engine that can attain an improvement in the strength of the secondary air supplying path, reduction of the space, rust prevention, reduced costs, reduced weight, simplified structure, and prevention of thermal damage to other components.

13 Claims, 4 Drawing Sheets

SECONDARY AIR SUPPLYING STRUCTURE OF INTERNAL COMBUSTION ENGINE

This nonprovisional application is based on Japanese Patent Application No. 2004-219883 filed with the Japan Patent Office on Jul. 28, 2004, the entire contents of which are hereby incorporated by reference.

BACKGROUND OF THE INVENTION

1. Field of the Invention

The present invention relates to a secondary air supplying structure of an internal combustion engine, which supplies part of intake air flowing through an intake system of the internal combustion engine or outside air, i.e., so-called secondary air, to an exhaust system of the engine.

2. Description of the Background Art

An example of vehicle-mounted internal combustion engines is equipped with a secondary air supplying apparatus for supplying secondary air to an exhaust system of the engine in an attempt to improve exhaust emissions. With the secondary air supplying apparatus, for example in a period in which the engine was cold-started and a catalyst arranged at some midpoint in the exhaust system is not activated yet, the secondary air is supplied to the exhaust system of the engine through a secondary air supplying path. When the exhaust system is supplied with the secondary air, unburned gases contained in the exhaust gases within the exhaust system are burned, and hydrocarbon (HC) and/or carbon monoxide (CO) in the exhaust gases are oxidized. Such oxidation of HC and/or CO in the exhaust gases reduces the remaining amount of HC and/or CO, whereby their emission to the outside in the period in which the catalyst is not activated is suppressed and the exhaust emissions are improved. Additionally, the combustion of the unburned gases warms up the catalyst quickly, whereby the catalyst enters the active state at an early stage after the cold-start of the internal combustion engine. Such a secondary air supplying structure of an internal combustion engine is disclosed in Japanese Utility Model Laying-Open No. 05-010735 (hereinafter referred to as Reference 1) and Japanese Patent Laying-Open No. 2003-035136 (hereinafter referred to as Reference 2).

Reference 1 discloses a structure with a secondary air supplying pipe arranged along the longitudinal direction of a cylinder head and a secondary air distributing pipe for distributing the secondary air from the secondary air supplying pipe to each cylinder exhaust system. According to Reference 2, a delivery passage constituting the secondary air supplying pipe is integrally formed with a flange of an exhaust manifold. Now, while it may be possible to integrally join the secondary air supplying pipe disclosed in Reference 1 to the flange of the exhaust manifold disclosed in Reference 2 and to form the secondary air distributing pipe at the flange of the exhaust manifold, it is not easy to integrally join the secondary air supplying pipe to the flange of the exhaust manifold.

SUMMARY OF THE INVENTION

An object of the present invention is to provide a secondary air supplying structure of an internal combustion engine that can be formed easily.

A secondary air supplying structure of an internal combustion engine according to the present invention includes: a secondary air supplying pipe that is arranged along a longitudinal direction of a cylinder head and that is integrally joined to a flange of an exhaust manifold; a secondary air distributing path arranged at the flange of the exhaust manifold for distributing secondary air from the secondary air supplying pipe to each cylinder exhaust system. The flange of the exhaust manifold is provided with an extending portion, protruding from the flange, at a position corresponding to the secondary air distributing path. A surface of the extending portion has a seating face that includes the secondary air distributing path and that conforms to an outer shape of the secondary air supplying pipe.

In another embodiment of the aforementioned invention, in a state where the exhaust manifold is fixed to the cylinder head, the secondary air distributing path is arranged to be inclined downwardly from the secondary air supplying pipe side toward the cylinder exhaust system of the cylinder head.

With the secondary air supplying structure of an internal combustion engine configured as above, as the flange of the exhaust manifold is provided with the extending portions protruding from the flange at the positions corresponding to the respective secondary air distributing paths, the secondary air supplying pipe can be fixed to the flange of the exhaust manifold using the extending portions. Thus, steps in the assembly can be reduced since a connecting structure by partial welding or the like can be employed. Accordingly, reduction in costs and simplification of the structure can be attained. Further, as a seating face that includes the secondary air distributing path and that conforms the outer shape of the secondary air supplying pipe is provided, positioning of the secondary air supplying pipe can be performed easily. Still further, as the secondary air supplying pipe can be fixed to the secondary air distribution path directly, the fixing structure to the flange of the secondary air supplying pipe can be stabilized to improve the strength of the secondary air supplying pipe. Additionally, reduction in space and weight, and simplification of the structure can be attained.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

In the following, referring to FIGS. 1–3, an exhaust manifold with a secondary air supplying structure of an internal combustion engine in an embodiment based on the present invention will be described.

Structure of Exhaust Manifold 100

Figure 1:
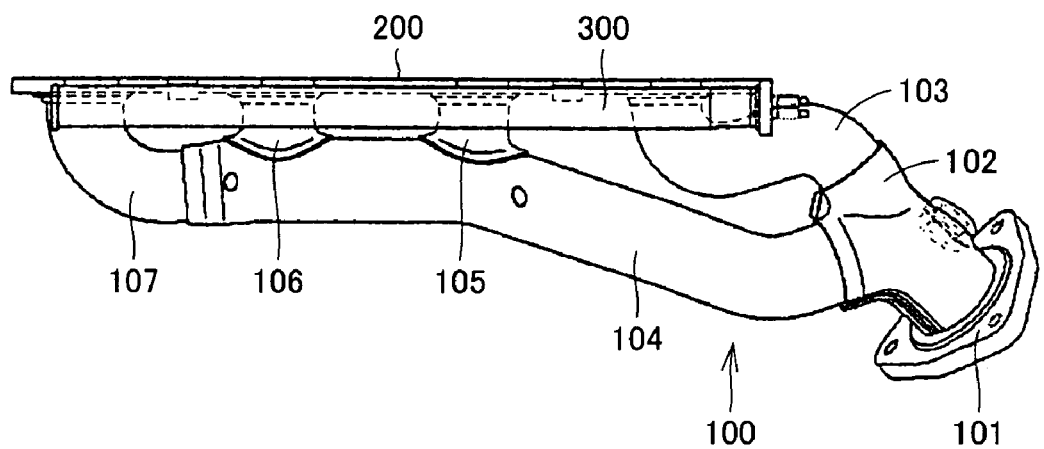
FIG. 1 is a plan view of an exhaust manifold according to the present embodiment.
Figure 2:
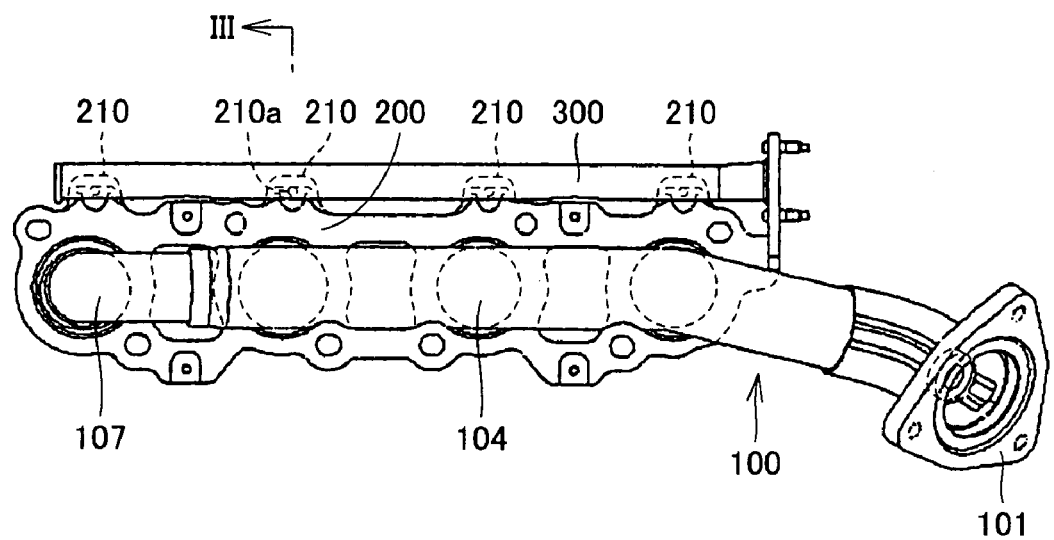
FIG. 2 is a side view of the exhaust manifold according to the present embodiment.

Referring to FIGS. 1 and 2, an exhaust manifold 100 according to the present embodiment includes an exhaust pipe flange 101, a branch exhaust pipe 102 connected to exhaust pipe flange 101, a first exhaust pipe 103 and a second exhaust pipe 104 connected to branch exhaust pipe 102, and a third exhaust pipe 105, a fourth exhaust pipe 106, and a fifth exhaust pipe 107 branching from second exhaust pipe 104. First exhaust pipe 103, third exhaust pipe 105, fourth exhaust pipe 106, and fifth exhaust pipe 107 are connected to an exhaust manifold flange 200.

Figure 3:
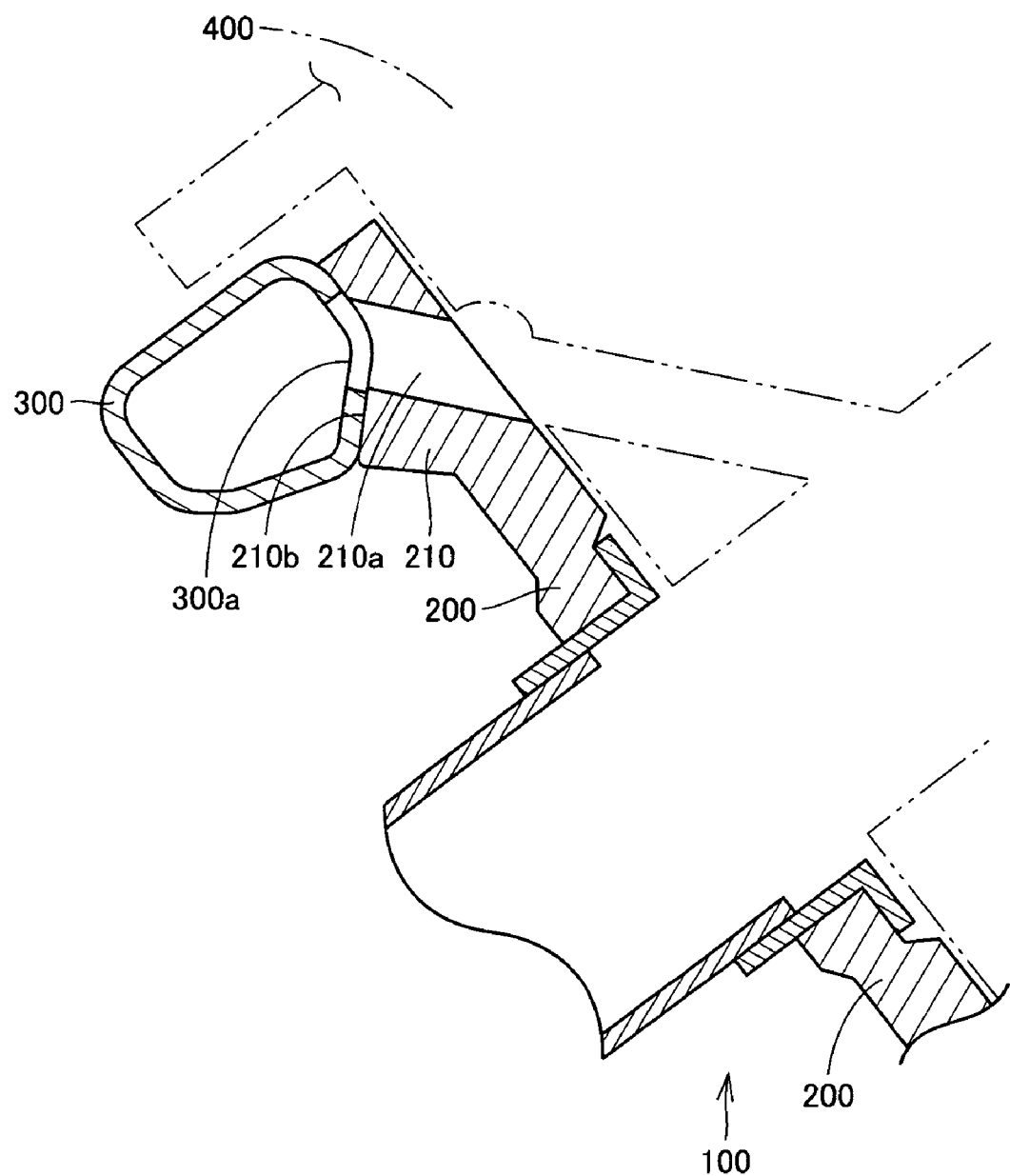
FIG. 3 is a cross-sectional view along arrow III in FIG. 2.

To exhaust manifold flange 200, a secondary air supplying pipe 300 made of stainless steel is mounted, which is arranged along the longitudinal direction of a cylinder head 400 (see FIG. 3). Secondary air supplying pipe 300 is for supplying the secondary air to each cylinder exhaust system (four cylinders in the present embodiment) in order to improve exhaust emissions.

Secondary Air Supplying Structure

Next, referring to FIGS. 2–5, a mounting structure of secondary air supplying pipe 300 to exhaust manifold flange 200 (a secondary air supplying structure) is described in detail.

To exhaust manifold flange 200, substantially semicircular extending portions 210 protruding substantially upward are arranged at four positions, corresponding to the number of cylinders. Extending portions 210 are each provided with a secondary air distribution path 210$a$. Accordingly, extending portion 210 is provided at a position corresponding to each cylinder exhaust system so as to communicate with each cylinder exhaust system of cylinder head 400. To a surface of extending portion 210 to which secondary air supplying pipe 300 abuts, a seating face 210$b$ that includes secondary air distributing path 210$a$ and that conforms to the outer shape of secondary air supplying pipe 300 is formed. In a state where exhaust manifold 100 is fixed to cylinder head 400 as shown in FIGS. 3 and 4, secondary air distributing path 210$a$ is arranged to be inclined downwardly from secondary air supplying pipe 300 side toward the cylinder exhaust system of cylinder head 400.

Figure 4:
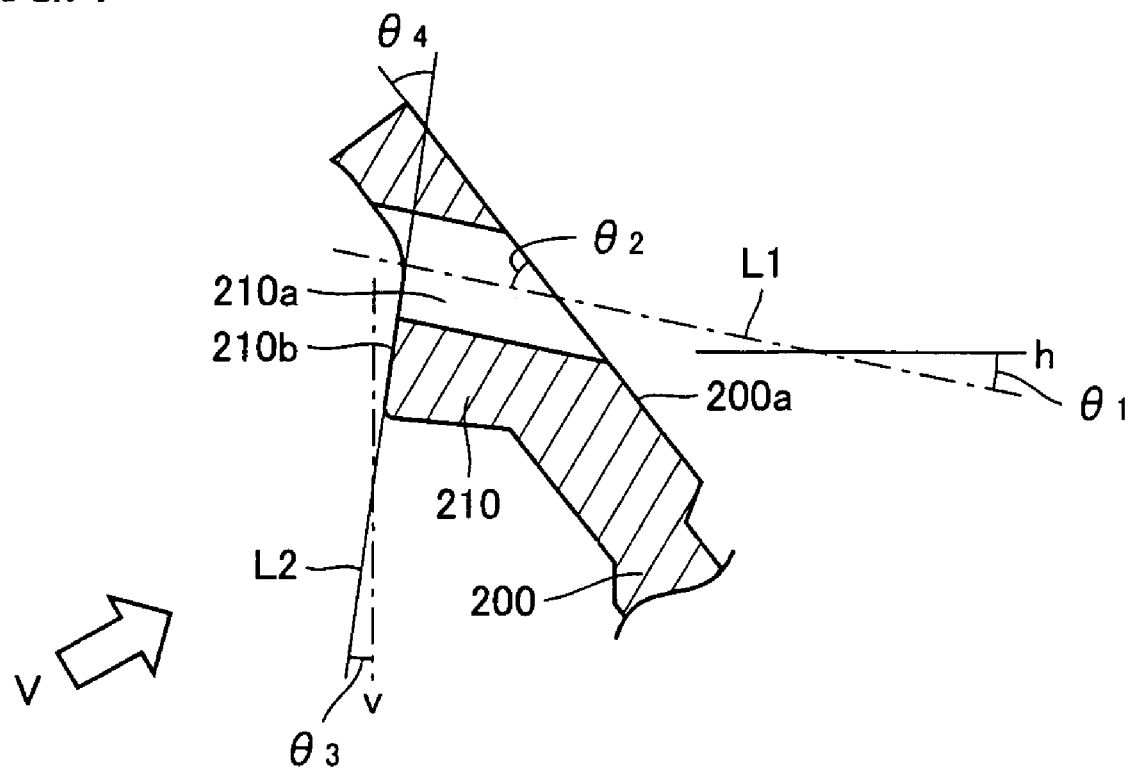
FIG. 4 is a partial cross-sectional view of the exhaust manifold flange corresponding to the cross section along arrow III in FIG. 2.
Figure 5:
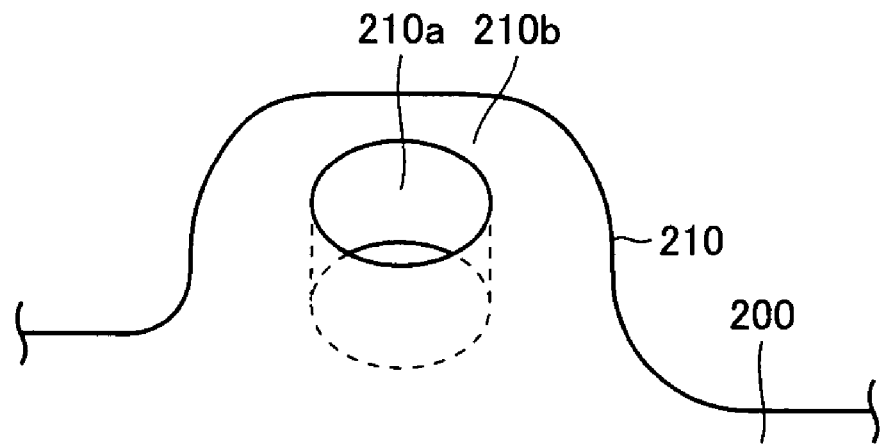
FIG. 5 shows a view along arrow V in FIG. 4.

Specifically, as shown in FIG. 4, in a state where exhaust manifold 100 is fixed to cylinder head 400, an intersecting angle ($\theta$1) of an axis L1 of secondary air distributing path 210$a$ relative to a horizontal line h is arranged to be: greater than 0° and at most about 30° with a V8 engine having a bank angle of 90°; greater than 0° and at most about 45° with a V6 engine having a bank angle of 60°; and greater than 0° and at most about 75° with an in-line multiple cylinder engine. An intersecting angle ($\theta$2) of axis L1 of secondary air distributing path 210$a$ relative to a bottom face 200$a$ of exhaust manifold flange 200 is: about 10°–about 45° with a V8 engine; about 10°–about 60° with a V6 engine; and about 10°–about 90° with an in-line multiple cylinder engine. Further, as shown in FIG. 4, as to seating face 210$b$ also, in a state where exhaust manifold 100 is fixed to cylinder head 400, an intersecting angle ($\theta$3) of a line L2 defining seating face 210$b$ relative to a vertical line V is arranged to be: about −45°–about 45° with a V8 engine; about −30°–about 60° with a V6 engine; and 0°–about 90° with an in-line multiple cylinder engine. It is noted that an intersecting angle ($\theta$4) thereof relative to a bottom face 200$a$ of exhaust manifold flange 200 is about 5°–about 85°.

Action and Effect

As above, according to the secondary air supplying structure of an internal combustion engine according to the present embodiment, by providing extending portions 210 to flange 200 of exhaust manifold 100, secondary air supplying pipe 300 can be fixed to extending portions 210. Here, if secondary air supplying pipe 300 is wholly supported, welding length is increased, whereby distortion due to welding is prone to occur and the weight of exhaust manifold 100 may be increased. On the other hand, by providing extending portions 210 partially, as in the present embodiment, welding portions and works are minimized, without an increase in the weight of exhaust manifold 100. Further, as secondary air supplying pipe 300 is directly fixed to extending portions 210, the fixed state can be stabilized, vibrations can be prevented, and the space can be reduced. Still further, by providing seating face 210$b$ that conforms to the outer shape of secondary air supplying pipe 300, positioning of secondary air supplying pipe 300 can easily be performed.

Figure 6:
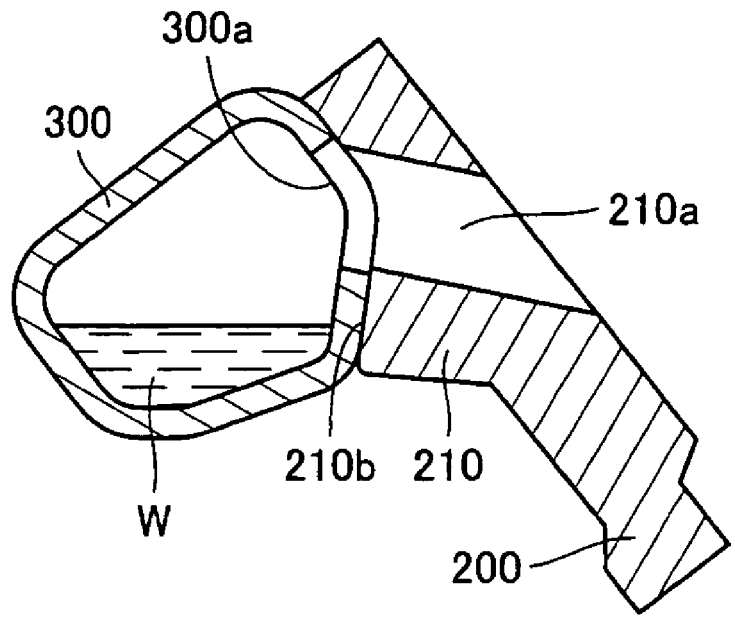
FIG. 6 is a schematic cross-sectional view showing a state in which exhaust condensed water is accumulated in a secondary air supplying pipe.
Figure 7:
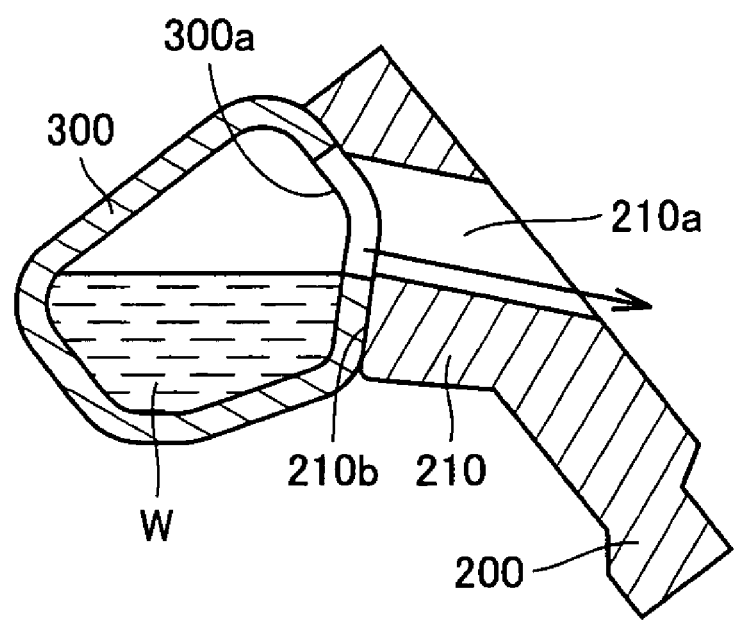
FIG. 7 is a schematic cross-sectional view showing a state in which exhaust condensed water accumulated in the secondary air supplying pipe is discharged.

In a state where exhaust manifold 100 is fixed to cylinder head 400, by arranging secondary air distributing path 210$a$ to be inclined downwardly from the secondary air supplying pipe 300 side toward the cylinder exhaust system of the cylinder head, and by arranging seating face 210$b$ to be inclined, as shown in FIG. 6, a space can be reserved in secondary air supplying pipe 300 for passing the secondary air, even when exhaust condensed water W is accumulated in secondary air supplying pipe 300, whereby secondary air supplying pipe 300 can be prevented from being filled with exhaust condensed water W. As a result, deterioration of the function of the secondary air supplying system can be prevented. Further, even when exhaust condensed water W is increased, as shown in FIG. 7, exhaust condensed water W free-falls secondary air distributing path 210$a$ to be discharged to the cylinder exhaust system side.

As one example of conventional structures, there is a structure in which a secondary air supplying path arranged at the flange of an exhaust manifold is formed with cast iron to direct a jet of the secondary air around the exhaust port of the exhaust manifold. With this structure, rust due to cast iron may appear in the secondary air supplying path, which may be trapped by a secondary air switching valve. The rust may be introduced into a combustion chamber and damage a piston, a piston ring, and a cylinder bore. Still further, in case of cast iron, as heat capacity is great and therefore heat is accumulated in the secondary air supplying path, the cylinder head or functional components within the cylinder head may thermally be affected disadvantageously. Still further, generally use of cast iron leads to problems such as an increase in the weight due to greater thickness and necessity of cutting work. On the other hand, the present embodiment does not involve any of those problems that occur when cast iron is used.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A secondary air supplying structure of an internal combustion engine, comprising:
   a secondary air supplying pipe that is arranged along a longitudinal direction of a cylinder head and that is integrally joined to a flange of an exhaust manifold;
   a secondary air distributing path arranged at said flange of said exhaust manifold for distributing secondary air from said secondary air supplying pipe to each cylinder exhaust system; wherein said flange of said exhaust manifold is provided with an extending portion, protruding from said flange, at a position corresponding to said secondary air distributing path, and a surface of said extending portion has a seating face that includes said secondary air distributing path and that conforms to an outer shape of said secondary air supplying pipe.

2. The secondary air supplying structure of an internal combustion engine according to claim 1, wherein in a state where said exhaust manifold is fixed to said cylinder head, said secondary air distributing path is arranged to be inclined downwardly from said secondary air supplying pipe side toward said cylinder exhaust system of said cylinder head.

3. The secondary air supplying structure of an internal combustion engine according to claim 2, wherein an intersecting angle of an axis of said secondary air distributing path relative to a horizontal line is arranged to be greater than 0° and at most about 30° with an engine having a bank angle of 90°.

4. The secondary air supplying structure of an internal combustion engine according to claim 2, wherein an intersecting angle of an axis of said secondary air distributing path relative to a horizontal line is arranged to be greater than 0° and at most about 45° with an engine having a bank angle of 60°.

5. The secondary air supplying structure of an internal combustion engine according to claim 2, wherein an intersecting angle of an axis of said secondary air distributing path relative to a horizontal line is arranged to be greater than 0° and at most about 75° with an in-line multiple cylinder engine.

6. The secondary air supplying structure of an internal combustion engine according to claim 2, wherein an intersecting angle of an axis of said secondary air distributing path relative to a bottom face of said exhaust manifold flange is arranged to be about 10°–about 45° with an engine having a bank angle of 90°.

7. The secondary air supplying structure of an internal combustion engine according to claim 2, wherein an intersecting angle of an axis of said secondary air distributing path relative to a bottom face of said exhaust manifold flange is arranged to be about 10°–about 60° with an engine having a bank angle of 60°.

8. The secondary air supplying structure of an internal combustion engine according to claim 2, wherein an intersecting angle of an axis of said secondary air distributing path relative to a bottom face of said exhaust manifold flange is arranged to be about 10°–about 90° with an in-line multiple cylinder engine.

9. The secondary air supplying structure of an internal combustion engine according to claim 2, wherein in a state in which said exhaust manifold is fixed to said cylinder head, an intersecting angle of a line defining said seating face relative to a vertical line is arranged to be about −45°–about 45° with an engine having a bank angle of 90°.

10. The secondary air supplying structure of an internal combustion engine according to claim 2, wherein in a state in which said exhaust manifold is fixed to said cylinder head, an intersecting angle of a line defining said seating face relative to a vertical line is arranged to be about −30°–about 60° with an engine having a bank angle of 60°.

11. The secondary air supplying structure of an internal combustion engine according to claim 2, wherein in a state in which said exhaust manifold is fixed to said cylinder head, an intersecting angle of a line defining said seating face relative to a vertical line is arranged to be 0°–about 90° with an in-line multiple cylinder engine.

12. The secondary air supplying structure of an internal combustion engine according to claim 2, wherein in a state in which said exhaust manifold is fixed to said cylinder head, an intersecting angle of a line defining said seating face relative to a bottom face of said exhaust manifold flange is arranged to be about 5°–about 85°.

13. A secondary air supplying structure of an internal combustion engine, comprising:

a secondary air supplying pipe that is arranged along a longitudinal direction of a cylinder head and that is integrally joined to a flange of an exhaust manifold;

a secondary air distributing path arranged at said flange of said exhaust manifold for distributing secondary air from said secondary air supplying pipe to each cylinder exhaust system; wherein said flange of said exhaust manifold is provided with a plurality of extending portions, protruding from said flange, each extending portion at a position corresponding to said secondary air distributing path, and a surface of said each extending portion has a seating face that includes said secondary air distributing path and that conforms to an outer shape of said secondary air supplying pipe.

* * * * *